Figure 1:
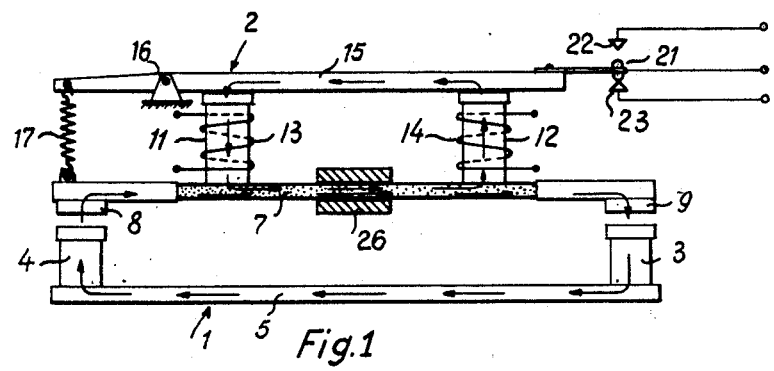

March 29, 1960  G. E. HOURS  2,930,889

MAGNETIC SIGNALLING SYSTEM FOR RAILWAYS

Filed Feb. 13, 1956

Inventor
G. E. Hours
By [signature]
Attys.

United States Patent Office 2,930,889
Patented Mar. 29, 1960

2,930,889

MAGNETIC SIGNALLING SYSTEM FOR RAILWAYS

Georges Edmond Hours, Courbevoie, France, assignor to Societe Industrielle de Laisons Electriques, Paris, France, a French company Application February 13, 1956, Serial No. 565,246

Claims priority, application France February 17, 1955

5 Claims. (Cl. 246—202)

This invention relates to railway signalling magnetic systems, of the type in which the variation of a magnetic flux is used to generate a signal or, more generally, to trigger a functional operation, without any mechanical contact between the track and the vehicles.

Magnetic systems of this kind are essentially constituted by a magnetic flux generating device hereafter called "the inductor" and by a device responsive to magnetic flux hereafter called "the receiver," one of said devices being mounted on the track, while the other one is mounted on the vehicle. The action of the inductor usually causes a response of the receiver only for one direction of movement of the vehicle over the track, which corresponds to a given direction of flow of the magnetic flux through the magnetic circuits of the inductor and receiver.

The inductor is provided with means for generating a flux in magnetic circuit normally closed through air in a well-defined direction. The receiver also comprises an open primary magnetic circuit through which the magnetic flux generated by the inductor circulates as the latter is brought into registration with the receiver. The same further comprises a secondary magnetic circuit associated with said primary circuit, means being provided to generate and sustain in said secondary circuit a magnetic flux and to use variations of said flux in response to the action of the inductor for triggering suitable functional operations. The flux generated by the inductor to be circulated through the primary circuit of the receiver will be called hereafter "the primary flux," while the flux circulating through the secondary circuit of the receiver will be called hereafter "the secondary flux."

The invention relates, more particularly, to the arrangement of the receiver.

Objects of the invention are to provide the two magnetic circuits of the receiver with a common portion, hereafter called the yoke, to generate and continuously sustain the secondary flux by suitable flux-generating means disposed in the remaining portion of the secondary circuit, i.e. out of the said yoke and to make the latter of a magnetic alloy of such nature, and/or to design it in such a manner, that its reluctance rapidly increases as a function of the flux passing therethrough within a certain range of variation of the latter.

It is a more particular object of the invention to make the yoke of an alloy having a magnetic permeability which decreases rapidly as a function of the flux passing through it within a certain range of values of the flux, and the value of the secondary flux normally circulating through the yoke (i.e. in the absence of any action of the inductor) is arranged to be within said range and sufficiently far from its lower limit to ensure a steep increase of the reluctance in response to the etsablishment of the primary flux.

Still another object of the invention is to increase the sensitivity of the device by reducing the cross-section of the yoke to a value just sufficient for ensuring the circulation through the yoke of the normal flux, in the absence of any action of the inductor.

Still a further object of the invention is to provide the primary circuit, that is to say, the circuit including the yoke and the magnet with one or more extensions of the yoke member which do not form part of the secondary circuit (i.e., the magnetic circuit controlling the armature), the extension or extensions serving to prevent excess flux from the magnet from passing directly into the magnetic circuit in a direction opposite to that of the normal flux.

Another object of the invention is to provide the receiver with a device capable of accelerating the drop in the secondary flux, this device having for its function to intervene when the relative displacement between the inductor and the receiver takes place at a very high speed, as would be the case with a fast train moving over a railway track. It is clear that, at such high speeds, the period during which the inductor flux is present in the yoke of the receiver is extremely short so that the delay available to trigger the desired functional operation could happen to be insufficient.

The above mentioned additional device permits ensuring a safe operation even at very high speeds. This device is essentially constituted by a copper ring surrounding the yoke and adapted to generate electromotive forces as a function of the speed of increase of the primary flux. The said electromotive forces produce in the secondary circuit the same effects as those resulting from the increase of reluctance.

Figure 2:
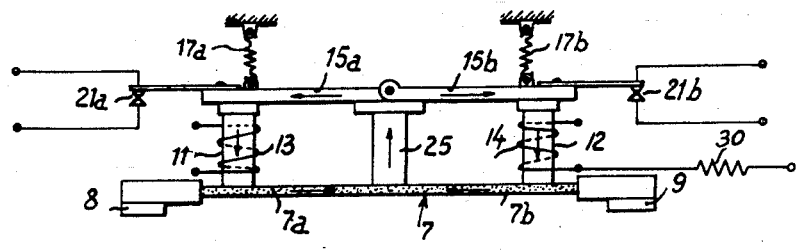

Preferred embodiments of the invention will be hereinafter described with reference to the accompanying drawings, given merely by way of example and in which:

Figure 1 is a diagrammatic front view of a magnetic signalling system according to the invention, and Figure 2 shows a modification of Figure 1.

Referring first to Figure 1, the signalling device according to the invention is essentially constituted by two main assemblies, viz. an inductor 1 and a receiver 2. One of said assemblies is mounted on a railway vehicle, such as a locomotive, while the other one is mounted on the track, the receiver being disposed where the indication is required.

The inductor 1 comprises three main elements, viz. two pole pieces 3 and 4 interconnected through a bar 5, these three elements being made of magnetic material preferably having only a low reluctance. A permanent flux is sustained in this magnetic circuit, at least one of the pole pieces 3 and 4 being either a permanent magnet or the core of an electro-magnet having its energizing coil fed with direct current. This last embodiment permits inverting the polarities of the pole pieces 3 and 4, which constitutes a considerable advantage in some applications, as explained hereunder.

In Figure 1, the inductor 1 and the receiver 2 have been shown in their operative relative configuration, in register with each other. It is clear that, except for this particular configuration, the path of the magnetic flux generated by the inductor is closed through air gap between the pole piece 4 and the pole piece 3.

The receiver 2 comprises a yoke 7 carrying at its ends shoes 8 and 9 respectively. In the example shown, the distance between the shoes 8 and 9 is equal to that between the pole pieces 3 and 4 of the inductor. The material of which the yoke 7 is made is a magnetic alloy having a reluctance which, when a given value of the flux is exceeded, increases rapidly as a function of the flux passing through it. In the vicinity of the ends of the yoke 7 and, preferably, with a certain spacing therefrom, for a reason to be explained later, are disposed two magnetic cores 11, 12 carrying two coils 13 and 14, respectively, fed with direct current, the respective polarities being such that the secondary flux circulates in the direction of the arrows.

The free ends of the magnetic cores 11 and 12 are associated with an armature 15 articulated on a fixed pivot 16 and continuously subjected to the action of a return spring 17. The armature 15 constitutes the active member of the receiving apparatus; its function is to trigger any desired operation such as opening or closing of one or more electric contacts. In the example shown, when the armature 15 is in its normal attracted position, as shown in Figure 1, it closes contacts 21 and 23, and when it is released from said position it switches the movable contact 21 from the fixed contact 23 to another fixed contact 22.

The armature 15 is responsive to the action of the inductor only when the relative polarities of the flux in the inductor and receiver are those indicated in the drawing. On the contrary, if both assemblies are brought into registration with the flux circulating in the inductor in the direction opposite to that shown in the drawing, the armature 15 is not released.

The operation of the apparatus described above is as follows:

When the inductor and receiver are not in register with each other, the coils 13 and 14, continuously fed with current, attract the armature 15 against the action of the return spring 17 and a secondary magnetic flux flows through the magnetic loop comprising the core 11, the mid portion of the yoke 7, the core 12 and the mid portion of the armature 15 in the direction of the arrows. The normal value of this secondary flux is so chosen that the armature 15 remains attracted by the cores 11 and 12 in spite of the action of the return spring 17, in all conditions of operation.

The number of turns of the coils 13 and 14, the value of the electric current passing through them, the cross-sections of the cores 11 and 12, the armature 15 and the yoke 7 as well as the nature of the yoke material are such that, in the absence of the inductor, the value of the yoke permeability corresponds, on the curve of permeability/induction, to a point located on the decreasing portion of said curve, but sufficiently far from its minimum to permit a considerable increase of the reluctance.

For example, in a specific construction of the device, with a yoke of rectangular cross-section (14 millimetres ×3 millimetres=0.42 cm.²) and made of Mu-metal, which is an alloy of Permalloy type (i.e., with high magnetic permeability and low hysteresis loss) but containing copper and manganese in addition to iron and nickel, a safe operation has been obtained with a normal value of the secondary flux of 3,400 maxwells, i.e. an induction of $$\frac{3,400}{0.42} = 8,100 \text{ gausses}$$

On the curve of permeability/induction of Mumetal, this corresponds to a value of Mu of about 7,000.

In these conditions, if the inductor 1 is brought into registration with the receiver 2, the flux generated by said inductor 1, instead of closing its path through the air gap follows a path including the shoe 8, the yoke 7 and the shoe 9. In the mid portion of the yoke 7, said flux is added with the secondary flux of the receiver provided by the energizing coils 13 and 14.

In the specific construction mentioned above, the critical value of the secondary flux for which the armature 15 is released has been chosen equal to 1700 maxwells. The drop from 3400 to 1700 maxwells is easily obtained with the specific yoke described above, in response to a primary flux of 1860 maxwells, the overall flux in the yoke being then $$1700 + 1860 = 3560 \text{ maxwells}$$

which corresponds to a magnetic induction of $$\frac{3560}{0.42} = 8500 \text{ gausses}$$

Now, the above mentioned permeability curve of Mumetal shows that this increase of induction from 8100 to 8500 gausses, i.e. about 5% determines a drop of permeability from about 7000 to less than 4000, i.e. nearly 50%.

As the armature 15 is released, in the example shown, the contact 21—23 is interrupted and the contact 21—22 is established. As soon as the inductor and receiver are no longer in register with each other, the initial conditions are reassumed. In other words, whenever the inductor and receiver are brought into the relative position shown in Figure 1, the armature 15 is released and pulled away from the cores 11 and 12 by the return spring 17 and is attracted once more when the inductor and receiver are moved out of register.

It may be seen that, with this arrangement, the secondary magnetic circuit of the receiver is practically closed permanently, which avoids any leakage of flux.

It is to be noted that, since the cores 11 and 12 are spaced from the ends of the yoke 7, excess flux from the inductor 1 is prevented from passing directly through the magnetic circuit of the receiver and, hence, from inverting the direction of the flux circulation subsequent to the release of the armature 15.

In the arrangement described above, both assemblies are polarised, so that the system is not actuated if one of the assemblies is reversed with respect to the other one (the pole piece 3 being then opposite the shoe 8 while the pole piece 4 is opposite the shoe 9). As a matter of fact, in such a reversed relative configuration, the flux would be reduced in the yoke 7 and increased in the armature 15, so that the latter would remain attached to the associated cores.

This provides a facility for actuating receivers mounted on railway vehicles only when said vehicles are traveling over the track in a predetermined direction, while similar receivers mounted on vehicles traveling in the opposite direction on the same track would not be actuated. This also permits, for example on a one-way traffic track, establishing a discrimination between the two directions of travel of the trains.

In order to increase the safety margin of the apparatus, in particular for high speeds, the yoke 7 may be surrounded by a thick ring made for example of copper, as indicated at 26 in Figure 1. As the inductor and the receiver are rapidly brought towards each other, the sudden arrival of the flux from the inductor induces in the ring 26 an electromotive force opposing the passage of the flux which tends to reduce the value of the secondary flux in the receiver thus facilitating the release of the armature 15. The efficiency of the ring 26 increases with the speed of the vehicle. The ring 26 also slows down the re-establishment of the initial secondary flux as the inductor and receiver are separated, thus retarding the re-attraction of the armature.

With the arrangement described, owing to the fact that the secondary flux is generated outside the portion of the yoke which is common to both circuits of the receiver, the secondary flux flows substantially only through the secondary circuit, the leakages of flux through the primary circuit being practically negligible. A major advantage of this feature is that the value of flux available in the receiver for useful operations is substantially equal to the overall value of the secondary flux.

In certain applications, it may be of interest to obtain, e.g. on a locomotive, two separate indications corresponding to actuation of two different sets of electric contacts. This result may be obtained by providing on the locomotive two separate flux receivers and, on the track, an electro-magnetic inductor with means to invert the polarity of the energizing current. Such a switching of polarity permits selectively actuating one of the receivers of the locomotive.

In order to make the apparatus more compact, the same result may be obtained with a double receiver such as diagrammatically shown in Figure 2. This construction comprises the elements of two simple receivers associated in series. The secondary circuit comprises two loops with a common portion. The first loop includes one half 7a of the yoke, a central bar 25, an armature 15a and a core 11 carrying an energizing core 13. The other loop of the secondary circuit includes the other half 7b of the yoke, the same bar 25, another armature 15b and another core 12 carrying an energizing coil 14. Each armature is provided with an individual return spring 17a, 17b respectively, and each one of them actuates a separate set of contacts such as a switch 21a, 21b, respectively.

The arrangement is such that the lines of force in each loop of the secondary circuit circulate along the path indicated by the arrows in Figure 2 under the influence of the coils 13—14. The operation of each one of the secondary loops is similar to that of the secondary circuit of Figure 1. Copper rings (not shown) could be provided on each half 7a, 7b of the yoke in the same manner as in Figure 1.

Now, it is advantageous that the value of the current through the energizing coils 13, 14, be practically non-responsive to rapid variations of the flux in the secondary circuit loops. To this effect, a resistor 30 of high ohmic value may be incorporated in series in the supply circuit of the coils, the energizing voltage being chosen with a sufficient high value. If no source of current of sufficient power is available, it is also possible to provide a self inductance in series with the energizing coils.

While the invention has been described with particular reference to preferred embodiments, it is not intended to limit the scope of the invention to the embodiments illustrated, nor otherwise than the terms of the subjoined claims.

In particular, the electro-magnets of the receiver may be replaced by one or more permanent magnets or any other means or combination of means capable of generating the required secondary flux.

For example, in Figure 2, the central bar 25 may be constituted by a permanent magnet, the energizing coils 13 and 14 being omitted.

What is claimed is:

1. A magnetic signalling system for railways comprising a vehicle carried device and a track device, one of said devices comprising a receiver and the other device comprising an inductor having the form of an elongated magnet, a magnetic circuit in said receiver including an elongated yoke member of magnetic material the reluctance of which increases in response to increase of the magnetic flux passing through said yoke member, a movable signalling armature operated by said magnetic circuit, means for biasing said armature towards its open position, means for producing in said magnetic circuit a constant magnetic flux capable of holding said armature in its closed position against the said bias, and a pair of longitudinally spaced pole pieces on said inductor to intermittently induce in said yoke member, when the latter is in register with said inductor, a magnetic flux which is in the same direction as said constant magnetic flux in the yoke member and which is such that said reluctance of the yoke member is increased to a value at which the total magnetic flux in said magnetic circuit is insufficient to hold the armature in said closed position.

2. A system according to claim 1, in which said yoke member is arranged to cooperate with said inductor through at least one extension of the yoke member which does not form part of said magnetic circuit, said extension serving to prevent excess flux from the inductor from passing directly into said magnetic circuit in a direction opposite to that of said constant flux.

3. A magnetic signalling system for railways comprising a vehicle carried device and a track device, one of said devices comprising a receiver and the other device comprising an inductor consisting of an elongated magnet, a pair of magnetic circuits in said receiver comprising three longitudinally spaced pole pieces, the center pole piece being common to both magnetic circuits, said magnetic circuits including a common elongated yoke member of magnetic material, the reluctance of which increases in response to increase of magnetic flux passing therethrough, a pair of movable signalling armatures each operated by a respective magnetic circuit, means for biasing each armature toward its open position, means for producing in each magnetic circuit a constant magnetic flux capable of holding the respective armature in closed position against the bias, and a pair of longitudinally spaced pole pieces on said inductor to intermittently induce in said yoke member when the latter is in register with said inductor a magnetic flux whereby the reluctance of the yoke member is increased to a value at which the total magnetic flux in each circuit is insufficient to hold its armature in closed position.

4. A magnetic signalling system comprising a vehicle carried device and a stationary device, one of said devices being a receiver and the other device being an inductor, said inductor comprising a bar of magnetic material, a pair of pole pieces fixed on opposite ends of said bar, means to force flux through said bar and pole pieces, said receiver comprising a paramagnetic yoke, the reluctance of which increases rapidly when a first value of the flux passing through the yoke is exceeded, a pair of shoes fixed to opposite ends of said yoke, the spacing between said shoes being equal to the spacing between said pair of pole pieces, a pair of electro-magnets fixed to said yoke between said pair of shoes, an armature bridging between said electro-magnets, resilient means to urge the said armature away from the electromagnets, contact means fixed to said armature to complete a circuit when the armature moves from its bridging position, the said electro-magnets producing a flux passing through said yoke and capable of attracting said armature against the action of said resilient means, whereby upon the inductor and receiver being brought into a predetermined opposing relationship the inductor pole pieces force through said yoke a flux which is in the same direction as the flux produced by the said pair of electro-magnets to exceed the first value of flux and increase the reluctance of the yoke and thereby reduce the magnetic attraction between the armature and shoes to release the armature to the action of the resilient means.

5. A magnetic signalling system according to claim 1, wherein said yoke has a cross section of such dimensions as to offer a reluctance which increases sufficiently to release said armature in response to the establishment of flux in the yoke by said inductor, the reluctance being just sufficient to allow a constant flux sufficient to hold the armature in closed position.

References Cited in the file of this patent

UNITED STATES PATENTS

| | | |
|---|---|---|
| 570,700 | Dixon | Nov. 3, 1896 |
| 1,019,484 | Kennedy | Mar. 5, 1912 |
| 1,376,978 | Stoekle | May 3, 1921 |
| 1,581,095 | Paul | Apr. 13, 1926 |
| 1,682,518 | Howe | Aug. 28, 1928 |
| 1,910,381 | Dowling | May 23, 1933 |
| 2,017,546 | O'Hagan | Oct. 15, 1935 |
| 2,345,490 | Martin | Mar. 28, 1944 |
| 2,414,583 | Duffy | Jan. 21, 1947 |
| 2,575,812 | Hufnagel | Nov. 20, 1951 |